United States Patent
Huang

(10) Patent No.: US 7,920,448 B2
(45) Date of Patent: Apr. 5, 2011

(54) RUNOUT DETECTION METHOD

(75) Inventor: Po-Chao Huang, Taipei County (TW)

(73) Assignee: Princeton Technology Corporation, Hsin Tien, Taipei County (TW)

(*) Notice: Subject to any disclaimer, the term of this patent is extended or adjusted under 35 U.S.C. 154(b) by 541 days.

(21) Appl. No.: 12/068,942

(22) Filed: Feb. 13, 2008

(65) Prior Publication Data

US 2009/0092009 A1    Apr. 9, 2009

(30) Foreign Application Priority Data

Oct. 5, 2007    (TW) .............................. 96137420 A
Oct. 5, 2007    (TW) .............................. 96137421 A

(51) Int. Cl.
     *G11B 20/18*      (2006.01)

(52) U.S. Cl. ............... 369/53.14; 369/30.24; 369/44.32; 369/53.12; 369/53.19; 360/77.04; 360/77.02; 360/75; 360/46

(58) Field of Classification Search ............... 369/30.24, 369/44.32, 53.12, 53.14, 53.19; 360/46, 360/75, 77.02, 77.04
See application file for complete search history.

(56) References Cited

U.S. PATENT DOCUMENTS

| | | | | |
|---|---|---|---|---|
| 5,402,280 A * | 3/1995 | Supino | ....................... | 360/77.04 |
| 5,677,809 A * | 10/1997 | Kadlec | ....................... | 360/78.09 |
| 6,064,638 A * | 5/2000 | Graba | ....................... | 369/44.28 |
| 6,137,753 A * | 10/2000 | Grimsley | ....................... | 369/44.32 |
| 6,347,017 B1 * | 2/2002 | Carlson | ....................... | 360/77.04 |
| 6,590,843 B1 * | 7/2003 | Zhuang | ....................... | 369/44.32 |
| 6,618,219 B1 * | 9/2003 | Ho | ....................... | 360/77.04 |
| 6,636,376 B1 * | 10/2003 | Ho | ....................... | 360/77.02 |
| 6,965,548 B2 * | 11/2005 | Chen | ....................... | 369/44.32 |
| 7,355,931 B2 * | 4/2008 | Yoshimoto | ....................... | 369/44.29 |
| 7,450,483 B2 * | 11/2008 | Fujiune | ....................... | 369/53.14 |
| 7,505,386 B2 * | 3/2009 | Chang | ....................... | 369/53.14 |
| 2005/0094523 A1 * | 5/2005 | Wu | ....................... | 369/53.14 |
| 2006/0044973 A1 * | 3/2006 | Yoshimoto | ....................... | 369/53.1 |
| 2007/0230025 A1 * | 10/2007 | Uchida et al. | ....................... | 360/77.04 |

FOREIGN PATENT DOCUMENTS

CN    1542780    11/2004
CN    1873790    12/2006

* cited by examiner

*Primary Examiner* — Wayne R Young
*Assistant Examiner* — Brenda Bernardi
(74) *Attorney, Agent, or Firm* — Muncy, Geissler, Olds & Lowe, PLLC

(57) ABSTRACT

A method for determining runout disc is disclosed. The method comprises: focusing on a focal point on a disc; driving the disc to spin the disc; generating a crossover signal according to a track of the disc crossing the focal point; and determining that the disc is a runout disc when the frequency of the crossover signal exceeds a pre-determine value.

16 Claims, 3 Drawing Sheets

RUNOUT DETECTION METHOD

BACKGROUND OF THE INVENTION

1. Field of the Invention

The invention relates to runout detection for optical discs, and in particular, to methods for detecting a runout disc in an optical apparatus.

2. Description of the Related Art

During the manufacturing stage of an optical disc, a concentric circling track is formatted for data storage, whereby data are written along the track. When a reading operation is performed, the track is followed confirming that the written data are locatable and accessible. Generally, distances between adjacent tracks, the track pitch, vary with different optical disc standards. For a compact disc (CD), the average track pitch is 1.6 µm. Alternatively, a digital versatile disc (DVD) has an average track pitch of 0.74 µm.

When manufacturing an optical disc, a motor may dig a central hole on the optical disc to facilitate installation. Theoretically, the central hole should be exactly in the center of the concentric circle. In practice, errors are unavoidable. The optical disc is made of polycarbonate, modeled and shaped under certain thermal conditions. Errors of deviation from the center of the central hole of the optical disc may range from 10 µm to 100 µm. The deviation is also referred to as an excentricity or a runout, which may cause track seeking failure where data stored on the optical disc are consequently inaccessible. It is therefore desirable to determine whether an optical disc has runout before reading data from it.

BRIEF SUMMARY OF THE INVENTION

An exemplary embodiment of a runout detection method is provided. Firstly, a focal point is formed on an optical disc, and the optical disc is driven to spin. While the optical disc spins, a crossover signal is generated when a track crosses the focal point. The optical disc is deemed as a runout disc when the frequency of the crossover signal exceeds a predetermined value.

In an alternative embodiment of a runout detection method, the optical disc is first driven to spin. Next, a focal point is locked onto the optical disc, such that a reflection signal is received from the focal point. A crossover frequency of occurrences when a track crosses the focal point is determined. Thereby, the optical disc is deemed as a runout disc when the crossover frequency exceeds a predetermined value. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
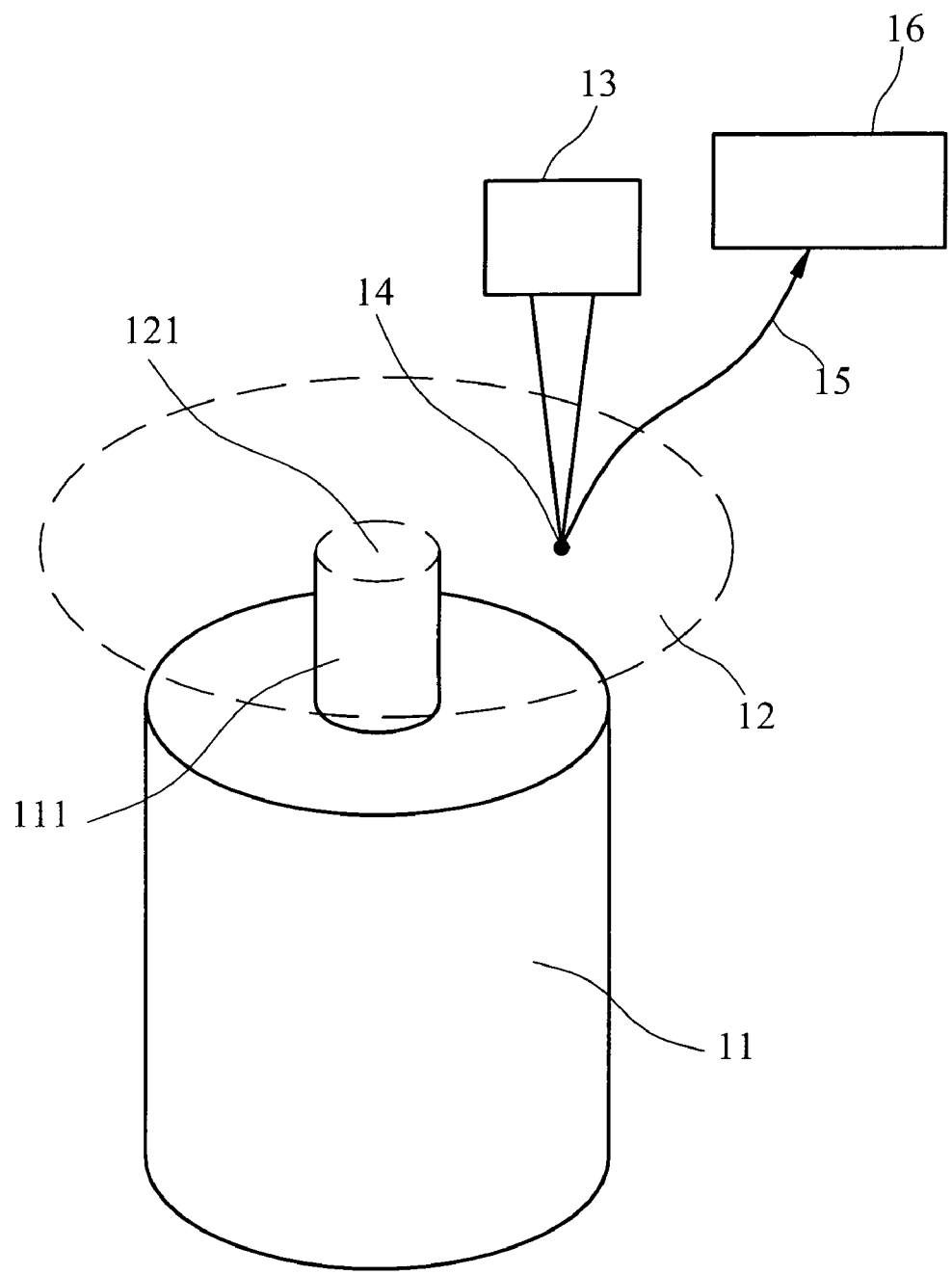
FIG. 1 shows an embodiment of an optical disc driver according to the invention.

FIG. 1 shows an embodiment of an optical disc driver according to the invention. The optical disc driver comprises a motor 11, a focus generator 13 and a sensor 16. The motor 11 comprises a central axis 111 for installation of an optical disc 12 by its central hole 121, such that the optical disc 12 is driven to spin. When the motor 11 spins the optical disc 12, the focus generator 13 generates a focal point 14 on the optical disc 12. The focal point 14 is located within ranges of data containing blocks on the optical disc 12 so that data on the track can be readable. A reflection signal 15 is reflected from the optical disc 12 to the sensor 16. The reflection signal 15 is typically an RP digital signal comprising stored information on the optical disc 12. When the track crosses the focal point 14, a crossover signal is induced as a part of the reflection signal 15.

If the optical disc 12 is a runout disc, which means there is an offset between the central hole 121 and the center of the concentric circle, the optical disc 12 spins elliptically. Since the focal point 14 is locked onto a static position, the track may repeatedly cross the focal point 14 while the optical disc 12 is elliptically spinning, and the crossover signal is thereby obtained by a sensor 16 along with the reflection signal 15.

Figure 2:
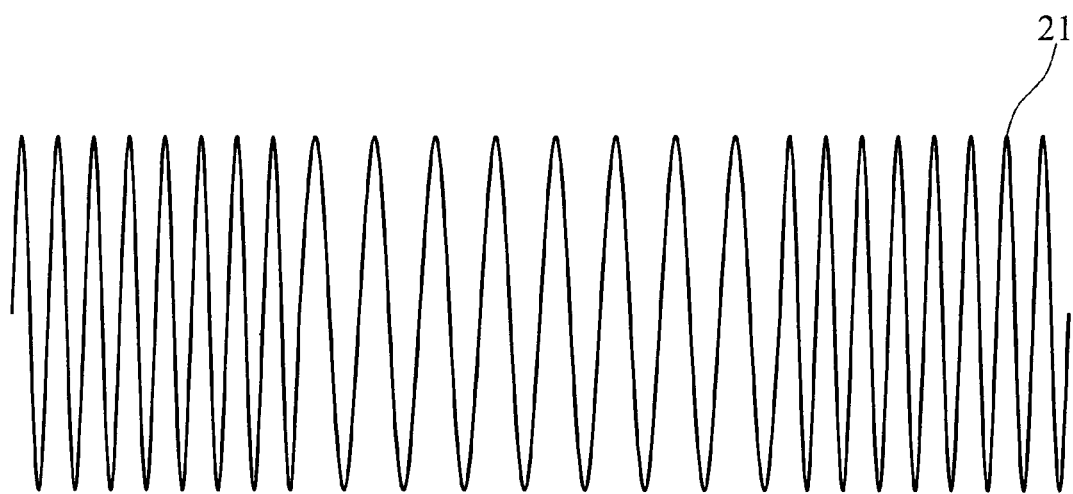
FIG. 2 is a waveform diagram of the crossover signal according to the invention.

FIG. 2 is a waveform diagram of the crossover signal according to the invention. When the track crosses the focal point 14, a crossover signal 21 is generated. A higher crossover signal 21 frequency indicates tight waveforms, and conversely, a lower frequency indicates loose waveforms. Thus, the density of the waveform is proportional to the crossover signal 21 frequency, which can be a basis for detecting a runout disc.

Experiments show that when the crossover signal 21 frequency lies between 15 to 30 KHz, the optical disc 12 is deemed a normal disc. When a frequency of 30 KHz or even up to 50 KHz is detected, the optical disc 12 is confirmed to be a runout disc. The crossover signal 21 frequency can be used to effectively detect a runout disc.

In the embodiment of the invention, the crossover signal 21 is estimated and generated every 8.3 ms to render the waveform in FIG. 2; however, it is not limited in the invention.

Figure 3:
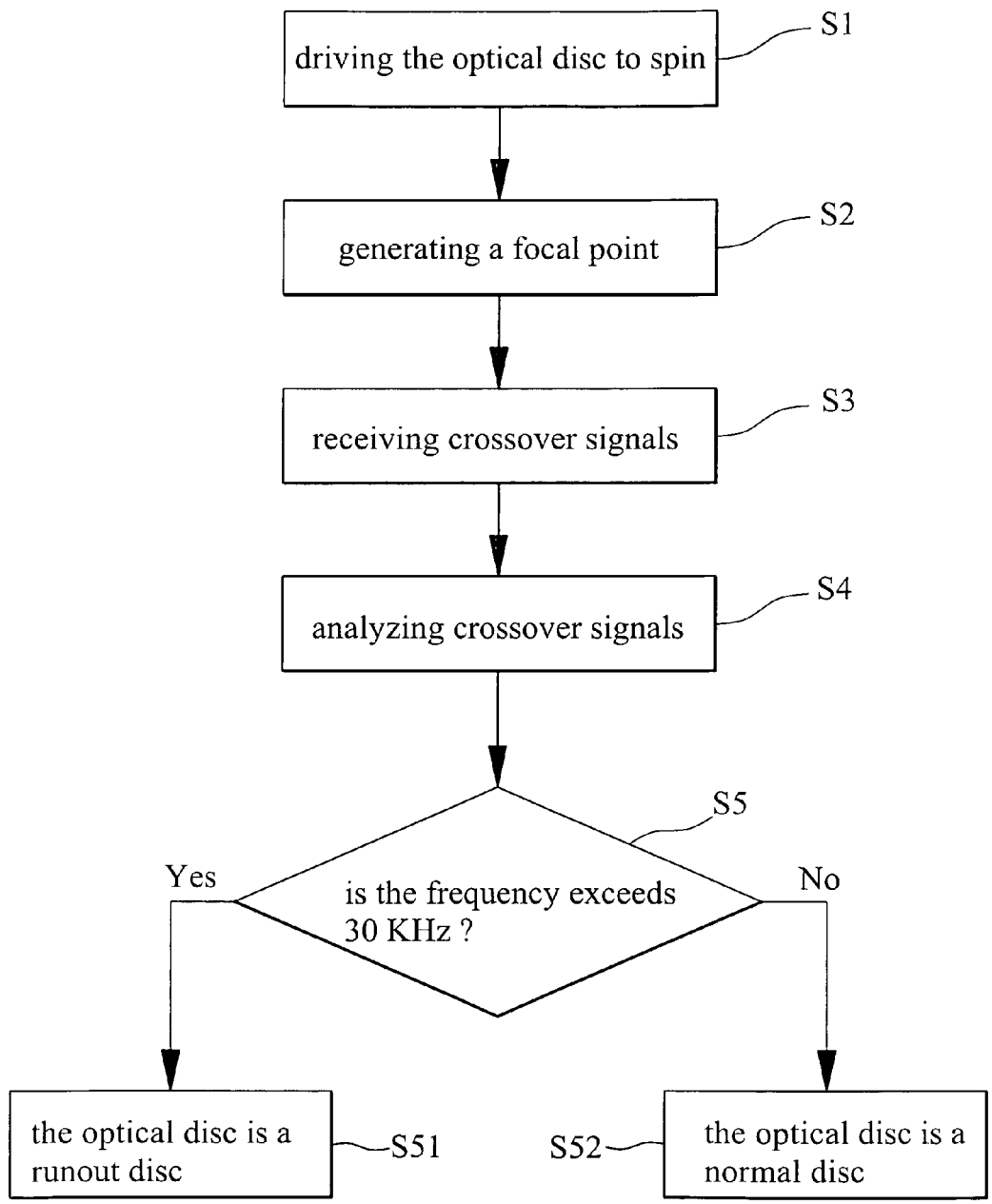
FIG. 3 is a flowchart of a runout detection method according to the invention.

FIG. 3 is a flowchart of a runout detection method according to the invention. Firstly, in step S1, the motor 11 drives the optical disc 12 to spin. In step S2, the position of focal point 14 is locked onto a static position while the optical disc 12 is spinning. A crossover signal is generated each time the data track crosses the focal point 14. In step S3, a sensor 16 is used to capture the crossover signal, and analysis thereof is performed in step S4. In step S5, it is determined whether the frequency of the crossover signal exceeds 30 KHz. If so, step S51 is processed, in which the optical disc 12 is deemed as a runout disc. Otherwise, the optical disc 12 is deemed as a normal disc in step S52. In an alternative embodiment, the crossover signal is generated when a track crosses the focal point, and a means for receiving the crossover signal is provided to receive the crossover signal before further procedures. Specifically, the reflected digital signals are collected from the focal point as the crossover signal when the track crosses the focal point. Frequency of the crossover signal is counted. The occurrence when the frequency falls within a predetermined range is also counted. The optical disc is deemed as a runout disc when the occurrence is less than a predetermined value.

In summary, the embodiments of the invention introduce an effective method to determine whether an optical disc is a runout disc, and accordingly, a particular process can be further performed to avoid data access failures. The application for the invention is submitted due to high industrial value.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A runout detection method for an optical disc, comprising:
   focusing on a focal point on the optical disc;
   driving the optical disc to spin;
   generating a crossover signal when a track crosses the focal point; and
   deeming the optical disc as a runout disc when a frequency of the crossover signal exceeds a predetermined value.

2. The runout detection as claimed in claim 1, further comprising collecting reflected digital signals from the focal point as the crossover signal when the track crosses the focal point.

3. The runout detection as claimed in claim 1, further comprising providing a means for receiving the crossover signal.

4. The runout detection as claimed in claim 1, wherein the crossover signal is an RP (Rapid Prototyping) digital signal.

5. The runout detection as claimed in claim 1, wherein the predetermined value is 30 KHz.

6. The runout detection as claimed in claim 1, wherein the crossover signal is generated according to the number of times the track crosses the focal point.

7. The runout detection as claimed in claim 1, wherein the focal point is located within ranges of data containing blocks on the optical disc.

8. The runout detection as claimed in claim 1, wherein the focal point is located at a static point.

9. A runout detection method for an optical disc, comprising:
   driving the optical disc to spin;
   focusing on a focal point on the optical disc, and receiving a reflection signal from the focal point;
   determining a crossover frequency of occurrences when a track crosses the focal point according to the reflection signal; and
   deeming the optical disc as a runout disc when the crossover frequency exceeds a predetermined value.

10. The runout detection as claimed in claim 9, wherein the reflection signal comprises a crossover signal generated upon the track crossing the focal point.

11. The runout detection as claimed in claim 10, wherein the crossover signal is generated according to the number of times the track crosses the focal point.

12. The runout detection as claimed in claim 9, wherein the reflection signal is an RP (Rapid Prototyping) digital signal.

13. A runout detection method for an optical disc, comprising:
   focusing on a focal point on the optical disc;
   driving the optical disc to spin;
   generating a crossover signal when a track crosses the focal point; and
   deeming the optical disc as a runout disc when the number of times of a frequency of the crossover signal between a predetermined range is less than a predetermined value.

14. The runout detection as claimed in claim 13, further comprising collecting reflected digital signals from the focal point as the crossover signal when the track crosses the focal point.

15. The runout detection as claimed in claim 14, wherein the crossover signal is an RP (Rapid Prototyping) digital signal.

16. The runout detection as claimed in claim 14, further comprising providing a means for receiving the crossover signal.

* * * * *